> United States Patent Office 3,592,881
Patented July 13, 1971

3,592,881
**CROSSLINKED, HEAT-SHRINKABLE POLY-
ETHYLENE FILM COMPOSITION**
George Joseph Ostapchenko, Williamsville, N.Y., assignor
to E. I. du Pont de Nemours and Company, Wilmington, Del.
No Drawing. Filed June 16, 1969, Ser. No. 833,767
Int. Cl. C08f 29/12
U.S. Cl. 260—897                                    4 Claims

ABSTRACT OF THE DISCLOSURE

A heat-shrinkable, heat-sealable film prepared by crosslinking an oriented film of a blend of low-density and high-density polyethylenes containing a minor amount of an ethylene, propylene, non-conjugated diene terpolymer. The crosslinking is accomplished with sulfur monochloride.

BACKGROUND OF THE INVENTION

This invention relates to polyethylene film and, more particularly, to heat-shrinkable polyethylene film.

Because of its many excellent properties, polyethylene film has been used extensively for wrapping and packaging. In such uses, it is often desirable for the film to be heat-shrinkable so as to facilitate the preparation of a skin-tight package and, in addition, be heat-sealable so as to be usable on automated packaging equipment. It is difficult to provide a film that satisfies both of these criteria, and previous attempts to do so have often resulted in films which required temperatures greatly in excess of 100° C. for heat shrinking or had a relatively low shrink force. Unfortunately, however, such temperatures are very near the "zero strength temperature" of ordinary polyethylene, i.e., the temperature at which the polyethylene film has a tensile strength which is nearly zero.

One approach to the problem of producing a heat-shrinkable film having good shrinking characteristics and high shrink force has been to treat the film with high energy irradiation in order to permit hot-stretch orienting as in Rainer et al., U.S. Pats. 2,877,500 and 3,144,399. Equipment for carrying out such a treatment is expensive. A further complication is that the film so produced is not amenable to being reprocessed because the irradiative crosslinking precedes the stretching and trimming operation, thus militating against efficient scrap and trim recovery.

Another approach to the production of a heat-shrinkable film is that involving the extrusion and stretching of a blend of high-density and low-density ethylene polymer, as described in Golike, U.S. Pat. 3,299,194. Such a system has the advantage that there is no need to irradiate the extruded film prior to orientation as is the case with the type of product described in U.S. Pat. 3,144,399. However, heat-shrinkable film made from the blend of resins has the shortcoming of a relatively narrow heat-sealing range. The ability to be heat sealed over a relatively broad temperature range becomes highly important when the film is to be applied to the wrapping of articles on automatic packaging machinery. An approach to improving the film of the blend of polymers in this respect has been to irradiate the oriented film either by ultraviolet irradiation or by high energy irradiation for a time sufficient to raise the zero strength temperature of the film. Again, especially in the case of the high energy irradiation, this approach entails the procurement of expensive irradiation equipment and in some situations it might be desirable not to have to impose a subsequent irradiation step whether it be by ultraviolet or high energy irradiation.

As can be seen from the foregoing, it would be quite desirable to provide a heat-shrinkable polyethylene film having a broad heat-sealing range which is suitable for use on automatic packaging equipment and which can be prepared by a relatively simple manufacturing process. Substantial realization of these goals is provided by the instant invention.

SUMMARY OF THE INVENTION

A crosslinked, oriented film of a blend of: (A) 70 to 85 weight percent of a low-density polyethylene, (B) 15 to 30 weight percent of a high-density polyethylene, and (C) 5 to 15 weight percent of an ethylene, propylene, non-conjugated diene terpolymer, said percentages being based on the total weight of (A) and (B); having a latent shrinkage of at least about 15% in each direction in the plane of the film at a temperature of 100° C.

This invention further comprises a process for the preparation of these films by forming the blend components into a self-supporting film, heating the film to a temperature of about 90° C. to 115° C. and stretching the film at least 5 times (5×) in each of two mutually perpendicular directions, cooling the film while maintaining the film substantially at its stretched dimension, and thereafter subjecting the film to the action of sulfur monochloride to a degree sufficient to raise the zero strength temperature of the film to at least about 175° C.

DETAILED DESCRIPTION OF THE INVENTION

The term "low-density polyethylene" as used in this description means either homopolymers of ethylene or ethylene copolymers having a density of from about 0.91 to 0.93 gram/cc. at 25° C. Copolymers of ethylene are defined as those containing a minor amount of another olefinically unsaturated monomer copolymerizable with ethylene, e.g., vinyl acetate, methyl methacrylate, ethyl acrylate, styrene, vinyl, vinyl methyl ether, diisobutylene, methacrylic acid and acrylonitrile. Such low-density polymers are ordinarily produced by free radical catalysis and are typically referred to as branched-chain polyethylenes. Golike, U.S. Pat. 3,299,194, contains further information about such polymers.

The term "high-density polyethylene" is defined herein as homopolymers of ethylene or copolymers of ehtylene with another monomer having a density of from about 0.94 to 0.98 gram/cc. at 25° C. The copolymers refer to polymers of ethylene with a minor amount of another olefinically unsaturated monomer copolymerizable therewith, e.g., propylene, 1-butene, 1-pentene, 1-hexene, 1-heptene, 1-octene, 1-decene, as well as mixtures of these monomers. The high-density polymers are typically produced by coordination-type catalysis and are commonly referred to as linear polyethylene. More details about such polymers are contained in Golike, U.S. Pat. 3,299,194.

The term "ethylene, propylene, non-conjugated diene terpolymer" is defined as an elastomeric terpolymer containing from about 20 to 75 weight percent ethylene and about 1 to 15 mole percent of the diene. The diene is defined as a non-conjugated alkadiene containing from 5 to about 22 carbon atoms and having at least one terminal double bond. Typical dienes are 1,4-hexadiene (which is preferred) and the several other dienes listed in Gresham et al., U.S. Pat. 2,933,480. Other terpolymers of ethylene and propylene are those wherein the third monomeric unit is one of the following: dicyclopentadiene, an alkenyl norbornene such as ethenyl norbornene, an alkylene norbornene such as methylene norbornene, an alkylidene norbornene such as ethylidene norbornene, and 1,5-cyclooctadiene. The terpolymers as defined herein have an intrinsic viscosity of from about 0.5 to 5 in benzene at 25° C. Details concerning the preparation of such terpolymers are available in the following U.S. patents: Gresham et al., 2,933,480; Tarney, 3,000,866; Gladding et al., 3,063,963; 3,093,620; and 3,093,621; and Natta et al., 3,260,708.

The blending of the components, the extrusion and orientation of the film can be conducted substantially as described in Golike, U.S. Pat. 3,299,194, and Goldman et al., U.S. Pat. 3,149,912. The sulfur monochloride ($S_2Cl_2$) may be incorporated into the film in any suitable way. A particularly convenient method involves immersing the film in liquid sulfur monochloride or in a solution of sulfur monochloride in an appropriate solvent such as carbon disulfide, ether, benzene, or toluene, and thereafter removing the solvent and any residual by-product from the film by gentle heating.

Preferably, the blend of the high- and low-density ethylene polymers should contain from about 70% to about 80% by weight of the low-density polymer and from about 20% to about 30% of the high-density polymer. It is preferred that the high-density component comprise a copolymer of ethylene with a minor amount of another α-olefin, in particular, one having from 4 to 10 carbon atoms. Preferably, the high density component should have a melt index of from about 0.4 to 1.5 and a density of from about 0.950 to about 0.957 gram/cc. Preferably, the low-density component should have a density of from about 0.91 to about 0.92 gram/cc. and a melt index of from about 1.5 to 8. It is further preferred that the exposure of the film to the crosslinking agent be such that the zero strength temperature of the treated film is at least 190° C.

The invention will now be described in connection with a specific example thereof wherein parts and percentages are by weight unless otherwise specified.

EXAMPLE

To illustrate the workings of this invention, 180 parts of a melt blend comprising 75% of a branched-chain polyethylene (ethylene homopolymer) resin having a melt index of 4.1 and a density of 0.913 gram/cc. at 25° C. and 25% of a linear polyethylene resin (an ethylene/1-octene copolymer) having a melt index of 0.45 and a density of 0.956 gram/cc. at 25° C. with 20 parts of a terpolymer comprising 72% of ethylene, 24% of propylene and 4% of 1,4-hexadiene are melt-blended in a screw extruder at 200° C. and then formed into a film. The melt blend also contains 250 parts per million of an anti-oxidant (2,6-di-t-butyl-4-methylphenol), 800 parts per million of mixed amide (approximately 533 parts of oleamide and 267 parts of stearamide) and 500 parts per million of silica. This resin is extruded through an apparatus such as is described in Goldman et al., U.S. Pat. 3,141,912. Conditions of extrusion and orientation are:

Melt temperature: 200° C.
Die opening: 35 mils
Cast tube thickness: 20 mils
Extent of stretch:
    5× (machine direction)
    5× (transverse direction)
Orientation temperature: 115° C.

The resulting oriented film is then immersed in liquid sulfur monochloride held at room temperature, withdrawn immediately, excess sulfur monochloride is removed by wiping the surface, and the film is thereafter dried. An evaluation of the test film along with a suitable control film which is made exactly as described for the test film except that it is not crosslinked with sulfur monochloride (and therefore is not within the scope of this invention) is shown below in tabular form.

| Physical property | Test film | Uncrosslinked film |
|---|---|---|
| Thickness (mils) | 1.53 | 1.51 |
| Modulus (1,000 p.s.i., MD/TD) | 53/50 | 65/60 |
| Tensile strength (1,000 p.s.i., MD/TD) | 9.3/8.5 | 9.8/8.5 |
| Elongation (percent, MD/TD) | 128/106 | 111/88 |
| Gloss | 76 | 71 |
| Pneumatic impact (kg.-cm./mil) | 4.0 | 3.7 |
| Haze (percent) | 2.4 | 3.2 |
| Shrinkage (percent, MD/TD) | 30/40 | 19/32 |
| Zero strength temperature (° C., ASTM-D-1430) | 190 | 140 |

The addition of the terpolymer is found to improve the haze, shrinkage, gloss and pneumatic impact and the resulting film made from the blend can be crosslinked to give improved burn-through resistance.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A crosslinked, oriented film of a blend of: (A) 70 to 85 weight percent of a low-density polyethylene, (B) 15 to 30 weight percent of a high-density polyethylene, and (C) 5 to 15 weight percent of an ethylene, propylene, non-conjugated diene terpolymer, said percentages being based on the total weight of (A) and (B); having a latent shrinkage of at least about 15% in each direction in the plane of the film at a temperature of 100° C. and a zero strength temperature of at least about 175° C.

2. A film as defined in claim 1 wherein said low-density polyethylene is an ethylene homopolymer, said high-density polyethylene is an ethylene copolymer with a minor amount of another α-olefin having from 4 to 10 carbon atoms, and said non-jugated diene is 1,4-hexadiene.

3. A film as defined in claim 2 wherein the percentage of said low-density polyethylene is from about 70 percent to 80 percent and the percentage of said high-density polyethylene is from about 20 percent to 30 percent.

4. A film as defined in claim 2 wherein said α-olefin is 1-octene.

References Cited
UNITED STATES PATENTS

| | | | |
|---|---|---|---|
| 3,299,194 | 1/1967 | Golike | 264—210 |
| 3,261,889 | 7/1966 | Van't Wout | 260—897 |
| 3,407,253 | 10/1968 | Yoshimura et al. | 264—289 |

MURRAY TILLMAN, Primary Examiner

C. J. SECCURO, Assistant Examiner

U.S. Cl. X.R.

260—79.5; 264—210